G. CONSTANTINESCO.
LIQUID WAVE TRANSMISSION.
APPLICATION FILED NOV. 18, 1916.

1,334,288.

Patented Mar. 23, 1920.
3 SHEETS—SHEET 1.

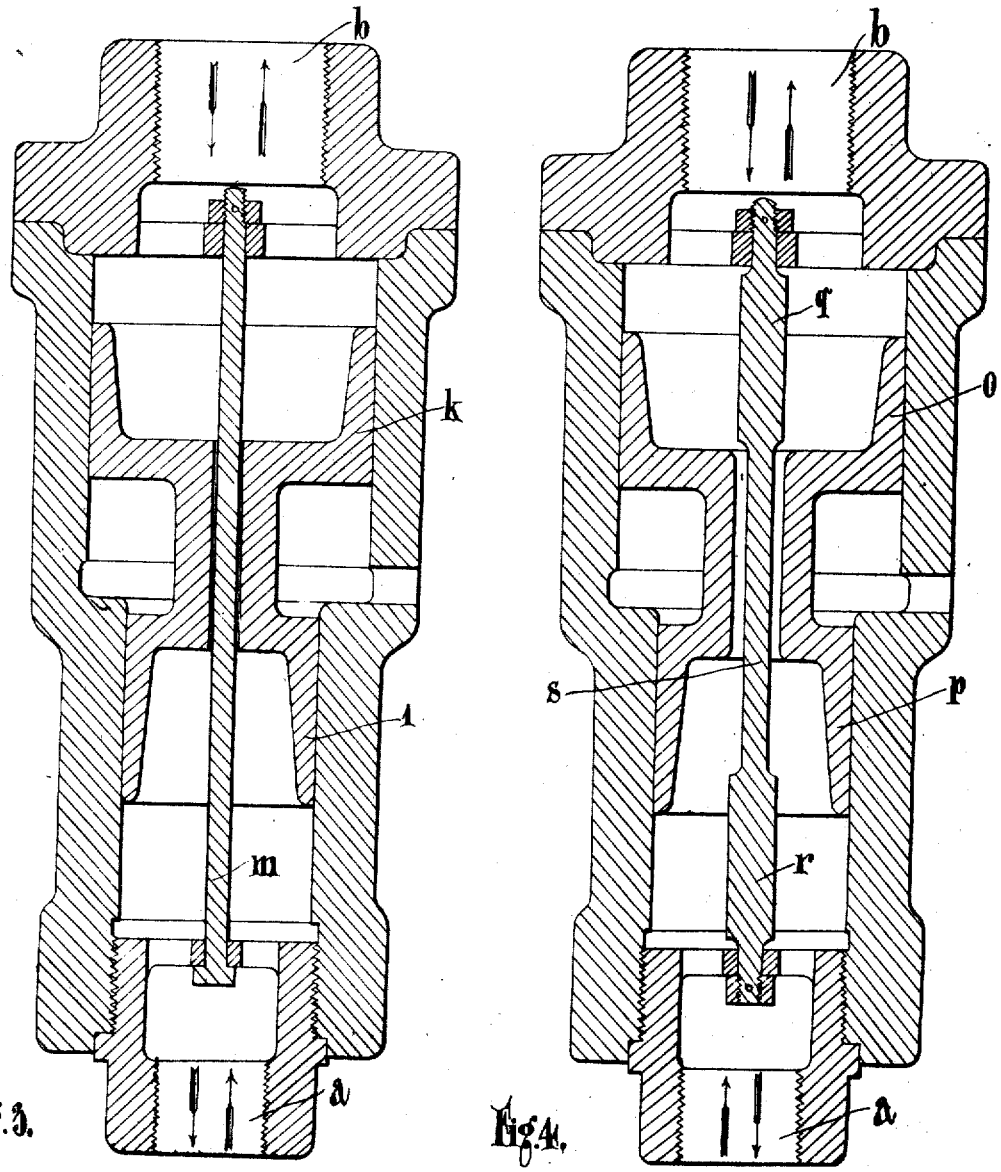

G. CONSTANTINESCO.
LIQUID WAVE TRANSMISSION.
APPLICATION FILED NOV. 18, 1916.
1,334,288.
Patented Mar. 23, 1920.
3 SHEETS—SHEET 3.
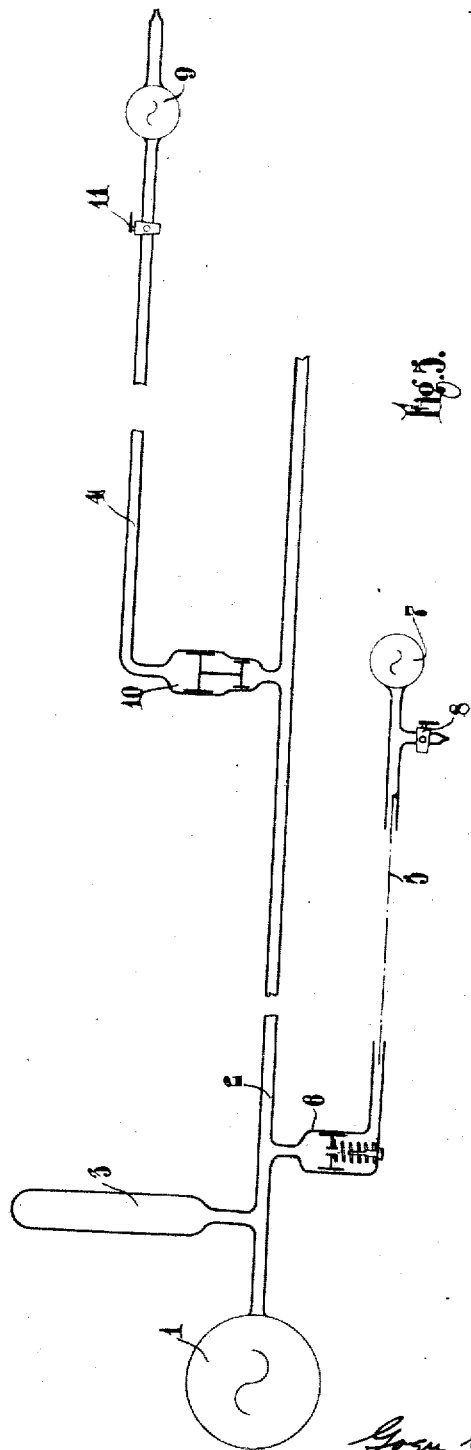

UNITED STATES PATENT OFFICE.

GOGU CONSTANTINESCO, OF ALPERTON, ENGLAND, ASSIGNOR OF ONE-HALF TO WALTER HADDON, OF LONDON, ENGLAND.

LIQUID WAVE TRANSMISSION.

1,334,288.   Specification of Letters Patent.   Patented Mar. 23, 1920.

Application filed November 18, 1916. Serial No. 132,027.

*To all whom it may concern:*

Be it known that I, GOGU CONSTANTINESCO, a subject of the King of Roumania, residing at The Haddon Engineering Works, Honeypot Lane, Alperton, in the county of Middlesex, England, have invented certain new and useful Improvements in and Relating to Liquid Wave Transmission, of which the following is a specification.

The present invention relates to systems for transmitting power by liquid wave motion of the kind described in British Letters Patent Nos. 9029 of 1913, 12438 of 1914 and 4350 of 1915, and relates especially to systems in which a number of implements on branch lines are connected to a main transmission line.

The object of the invention is to provide an apparatus by which the wave or energy current feeding a certain tool may be cut off from the branch line leading to such tool when the tool is not required.

A further object of the invention is to provide means whereby the line can be fed with fresh liquid without interfering with the wave motion, or with the operation of generators and receivers on the line.

The invention consists in inserting between the main transmission line and the branch line, which may be a flexible pipe or an unbalanced line, a device consisting of a body oscillating with the liquid and arranged so that the waves only travel in the branch line when an implement on such line is in operation.

The invention further consists in the employment as a cut off of a piston or diaphragm which allows a leak between the main transmission line and the branch line in combination with a cock arranged at any point on the branch line in such a manner that when the cock is open, or according to a modification, when the cock is closed, the transmission of the waves into the branch line is cut off.

The invention further consists in controlling the admission of the wave energy to a branch line by means of devices here denominated as a condenser, transformer, inertia device or simple piston having a leak together with a cock controlling a discharge of fluid from the branch line near an implement or motor for the implement, or at any other point of the branch line.

The invention consists in feeding a wave transmission line by means of a pump, pumping into a vessel completely filled with liquid here termed a capacity which communicates with the line through a pipe whose length is a quarter of the wave length of the waves in the transmission line at the periodicity used.

The invention also consists in connecting the feeding quarter wave length pipe to the line at a point at which the pressures vary from maximum to minimum values.

The invention also consists in the improved means for feeding a wave transmission line hereinafter described.

The invention also consists in various constructions of cut off adapted to be placed between the main transmission line and branch lines hereinafter described.

According to the present invention condensers of the type described in application Ser. No. 63,762 with leaks or simple floating pistons, or diaphragms, or transformers may be employed to allow a permanent leak and to cut off the wave from the line when the leak becomes excessive or is entirely stopped, and in conjunction with suitable drain cocks and stop cocks in the line any desired conditions as regards escape of liquid from the line during working, or when the tool is stopped, can be obtained.

In order to avoid excessive leak of liquid when the tool is not working, the cut out may be arranged so as to have a reduced leak in the extreme position when the tool is not working and a greater leak at the position of normal working. Further, differential pistons may be employed as cut outs with a ratio of transformation of one to two or more provided with a permanent leak from the high pressure side, which is connected to the main transmission line, to the low pressure side which is a branch line, together with a drain cock on the branch line or on the working instrument.

With such an arrangement if the cock is closed the leak in the cut out brings the mean pressure in the branch line up to the mean pressure in the main line, but owing to the larger area of the transformer piston on the side of the branch line this piston moves toward the high pressure side and remains in this position. When this occurs the branch line is subjected only to a static pressure equal to the mean pressure in the main line, but there will be no waves produced in the branch line. If the cock is opened to such a degree that the mean pressure in the branch line falls to the normal value, the transformer will begin to work and waves will be transmitted through the branch line.

Referring to the accompanying drawings:—

Fig. 3 shows a form of transformer which allows a leak when the line is working.

Fig. 4 shows another type of transformer suitable for tools working with a considerable amount of leak.

Fig. 5 is a diagram showing an arrangement of implements and cut off devices on a liquid wave transmission line.

Figure 1:
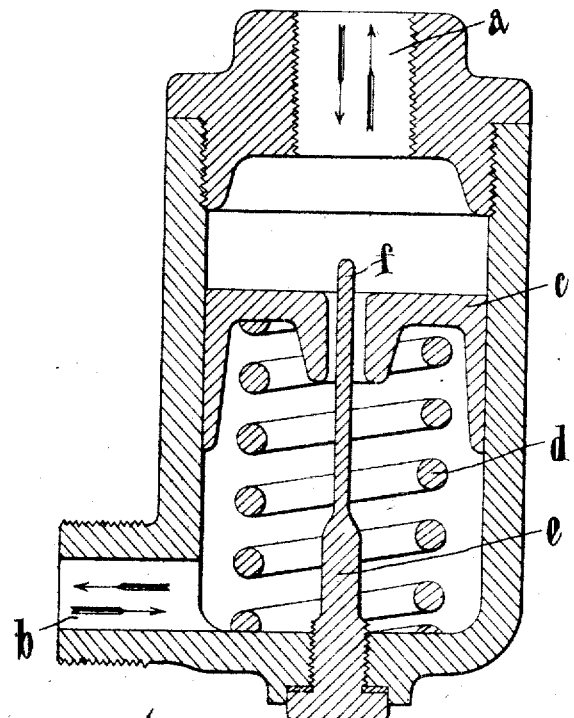
Figure 1 shows a simple device for cutting off the wave energy from a branch line.

In the form of cut out shown in Fig. 1 the main transmission line is connected at $a$ and the branch line at $b$. The flow of liquid is controlled by an oscillating piston $c$ held by a spring $d$ and having an aperture through its center fitting closely over the lower end of the spindle $e$ and allowing clearance around the end $f$ of the spindle, this end being of smaller diameter.

It will be seen that with this arrangement if the pressure drops in the branch line the piston $c$ will compress the spring $d$ and close the line when the part $e$ of the spindle enters the aperture in the piston.

Figure 2:
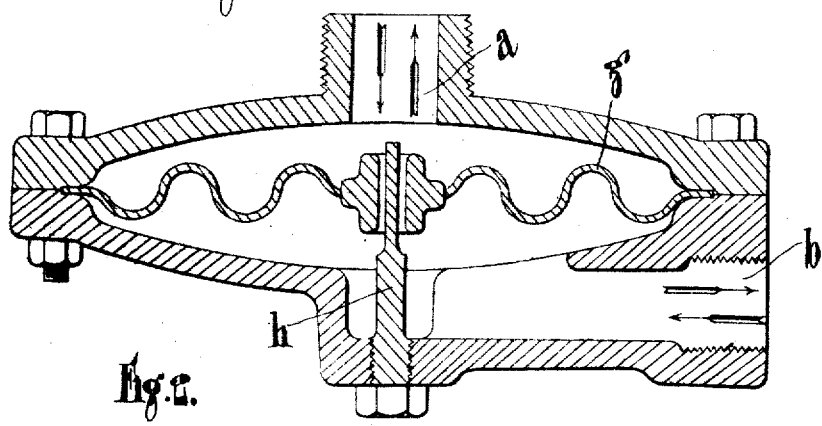
Fig. 2 shows a similar device in which a diaphragm is employed.

In another form of the invention shown in Fig. 2 the main line is connected at $a$ and the branch line at $b$; the piston is replaced by a diaphragm $g$ having a central aperture adapted to be closed by the lower end of the spindle $h$. This device is intended to work with tools in which a certain amount of leak is allowed during working.

The fit between the spindle $e$, Fig. 1, and the spindle $h$, Fig. 2, and the apertures through which these spindles pass is not quite a tight fit, a certain amount of leak being still allowed from the main line to the branch line.

In the form of the invention shown in Fig. 3, the controlling device is a transformer comprising a differential piston $k$, $l$, adapted to slide over a central rod $m$, a certain clearance being allowed around the rod which is fixed in position. The main line is connected at $a$ and the branch line at $b$.

In this form of the invention the passage around the rod is easily kept clear of grit by the oscillations of the piston. In this case the tool will have a certain amount of leak when working and when this leak is stopped the waves are cut off from the branch line, because the mean pressure is equalized on both pistons and the pistons are thus pressed toward the main line so that the oscillation of the piston is stopped. If, on the other hand, the leak becomes excessive so that the mean pressure on the smaller area of the piston is sufficiently in excess of that on the larger area to force the pistons toward the branch line the oscillation of the pistons is again stopped so that the wave in this case is also shut off from the branch line. The ratio of transformation recommended should be at least 2 to 1 in order that the maximum pressure in the main line may not be able to overcome the force on the low pressure piston, which would tend to produce a certain amount of hammering if it should happen that the ratio is less than 2 to 1.

In the form of the invention shown in Fig. 4 there is also employed a transformer comprising a differential piston $o$, $p$, having a central aperture and working over a fixed rod of larger diameter at its ends $q$, $r$, than at its center portion $s$. The main line is connected at $a$ and the branch line at $b$. This form of cut out is suitable for tools working with considerable leakage, for example, rock drills with water supplied at the implement for cleaning out the hole drilled.

In this type of transformer used as a cut out, the normal working leak is provided for when the piston is working over the central portion $s$ of the rod. The fit between the part $r$ and the piston is enough to allow a small leak from the main line to the branch line. If the leak in the branch line increases, the mean pressure drops and the piston moves upward so that the leak through the transformer is increased owing to the smaller diameter of the part $s$ of the rod. If, however, the leak is excessive, the differential piston moves still further upward, cutting off the leak against the part $q$ which fits the piston.

If the leak from the branch line is stopped the mean pressure in the branch line increases and the transformer stops with its piston at the bottom of its stroke, i. e., on the high pressure side, so that in this form of the invention the wave energy is cut off from the branch line when there is no leak and also when the leak is excessive.

The clearance between the rod $s$ and its aperture in the piston should be only just sufficient to give the necessary leak at the working tool. In the figure this leak is shown exaggerated in order to make the construction clear. If the clearance is excessive, it would interfere with the propagation of the waves. The intermediate space between the high and low pressure pistons must be kept in permanent communication with the atmosphere in order to avoid accumulation of liquid in it which would stop the working.

Fig. 5 shows diagrammatically the general arrangement of the plant with cut outs formed as above described. The plant comprises a generator 1 working on a main line 2. A large capacity 3 is provided as described in British Letters Patent No. 4349 of 1915. In the figure, two branch lines are shown, one 4 which is suitable for working an implement in which a permanent leak is desired, and another 5 working a device such as a rotary motor or riveting hammer in which no leak is required.

In the arrangement illustrated one branch line is shown connected to the transmission line 2 close to the generator. Between the line 2 and the beginning of the line 5, which may consist of flexible hose, there is provided a cut out 6 of the type shown in Fig. 1. Close to the rotary motor 7 situated at the end of the branch line 5 there is provided a drain cock 8. The branch line 4 is assumed to be driving a device 9 such as a rock drill, in which there is a permanent leak when working and there is provided between the line 4 and the main transmission line 2 a transformer 10 of the type shown in Fig. 3.

In this case when the rock drill is not working the stop cock 11 is closed, the branch line 4 remaining under the mean pressure, but without any wave motion. The main difference between the two methods of cut out, that is, that by condenser and that by transformer, is, that by using a cut out of the condenser type the branch line is not under pressure at all when the working tool stops, but during this time a continuous leak is allowed through the drain cock in order to keep down the mean pressure.

On the other hand, with the transformer type, the branch line is under constant static pressure when the tool is stopped, but in this case there is no leak through the drain cock. When the tool is not working in the condenser type there is a leak through the drain cock, while in the transformer type there is no leak.

It should be noticed that when using a cut out of the condenser type a leak may be allowed even when the tool is working. In order to stop the piston of a cut out of this type a rapid discharge through the outlet cock is necessary. After this rapid discharge the leak may be much reduced, in fact may be reduced considerably below the normal working leak. The transformer type also may be stopped by a permanent leak by completely opening the drain cock.

It will be seen that many combinations are possible and that those illustrated and described are only examples of the various possible methods.

In order to feed a wave transmission line, for instance, a high frequency line in which the wave length is of about 2 meters, we provide as generator a pump pumping oil into a capacity of say 10 liters, from any suitable supply. The capacity is connected through a pipe which may be of any diameter, with the transmission line, connecting with this line at a point close to the generator. The length of pipe in the case considered will be half a meter. In order with this arrangement to supply additional oil to the line, it is merely necessary to keep the pump working, pumping into the capacity which is in communication with the line. If it is desired to feed the line at points remote from the generator, all that is necessary is to connect a pump, capacity and quarter wave length pipe to the line at points at which the pressure in the line rises to the maximum and falls to the minimum values. This feature is specifically claimed in application Serial No. 246,396 filed July 23rd, 1918.

It will be seen that with such an arrangement, at the point where the quarter wave length connects with the capacity, there will be no pressure variation, so that the pumping of the oil into the capacity, and the passing of this oil from the capacity to the line will take place under a constant pressure.

In cases in which the wave length is considerable, it may be inconvenient to have a pipe of the full quarter wave length between the capacity and the transmission line, and in such case we may provide an equivalent quarter wave length pipe by the use of suitable capacity or inertia.

I claim:—

1. In a fluid wave transmission system having a main line and a branch line, means for cutting in and cutting off the wave energy in the branch line including a device for producing a leak in said branch line.

2. In a fluid wave transmission system, a main line and a plurality of branch lines, and means for cutting off the wave energy in one branch line without affecting the transmission of wave energy to the other branch line.

3. In a fluid wave transmission system, a main line, a branch line, a member vibrating in response to the wave action and admitting of the passage of a small quantity of fluid past it from the main to the branch line, and means for preventing said member from vibrating and for cutting off wave energy in the branch line said means comprising provision for varying the quantity of liquid flowing past said member.

4. In a fluid wave transmission system, a main line, a branch line, a vibrating inertia device for transmitting impulses from the main to the branch line, said device admitting of the passage of a small quantity of fluid, and means for rendering said inertia device stationary, said means comprising provision for controlling the pressure in the branch line.

In testimony whereof I have signed my name to this specification.

GOGU CONSTANTINESCO